(12) United States Patent
Hung et al.

(10) Patent No.: US 9,891,430 B2
(45) Date of Patent: Feb. 13, 2018

(54) LASER PROJECTOR

(71) Applicant: OPUS MICROSYSTEMS CORPORATION, Taipei (TW)

(72) Inventors: Chang-Li Hung, Taipei (TW);
Feng-Chun Yeh, Taipei (TW);
Yu-Sheng Liou, Tainan (TW)

(73) Assignee: Opus Microsystems Corporation, Taipei (TW)

( * ) Notice: Subject to any disclaimer, the term of this patent is extended or adjusted under 35 U.S.C. 154(b) by 0 days.

(21) Appl. No.: 14/618,666

(22) Filed: Feb. 10, 2015

(65) Prior Publication Data
US 2016/0231560 A1    Aug. 11, 2016

(51) Int. Cl.
G02B 26/10 (2006.01)
G02B 26/08 (2006.01)
G02B 17/04 (2006.01)
G02B 27/00 (2006.01)

(52) U.S. Cl.
CPC ............ G02B 26/101 (2013.01); G02B 17/04 (2013.01); G02B 26/0833 (2013.01); G02B 27/0031 (2013.01)

(58) Field of Classification Search
CPC ................ G02B 26/101; G02B 26/108; G02B 26/0833; G02B 26/105; H04N 9/3129; H04N 3/23; H04N 3/233; H04N 3/237; G03B 21/14; G03B 21/142; G03B 21/147
USPC ............ 359/201.1, 201.2, 202.2, 662, 205.1, 359/206.1, 207.1, 207.2, 207.3, 207.4, 359/207.5, 207.8; 353/69, 70
See application file for complete search history.

(56) References Cited

U.S. PATENT DOCUMENTS

| | | | |
|---|---|---|---|
| 6,678,095 B2 * | 1/2004 | Kelly | G02B 5/06 359/669 |
| 6,859,329 B2 | 2/2005 | Kobayashi | |
| 7,256,917 B2 | 8/2007 | Ishihara | |
| 7,385,745 B2 | 6/2008 | Ishihara | |
| 7,839,552 B2 | 11/2010 | Ishihara | |
| 7,878,658 B2 | 2/2011 | Hudman et al. | |
| 7,957,047 B2 | 6/2011 | Konno | |
| 8,107,147 B2 | 1/2012 | Hudman et al. | |
| 8,159,735 B2 | 4/2012 | Konno et al. | |
| 2004/0141221 A1 | 7/2004 | Togino et al. | |
| 2005/0117188 A1* | 6/2005 | Ishihara | G02B 26/101 359/202.1 |
| 2009/0251668 A1 | 10/2009 | Takahashi | |
| 2010/0060863 A1 | 3/2010 | Hudman et al. | |
| 2010/0253991 A1 | 10/2010 | Yamada | |
| 2011/0141441 A1 | 6/2011 | Konno et al. | |

* cited by examiner

*Primary Examiner* — Marin Pichler
(74) *Attorney, Agent, or Firm* — Muncy, Geissler, Olds & Lowe, P.C.

(57) ABSTRACT

A laser projector includes a laser source module for generating an input light beam, a deflection component that deflects the input light beam to mutually orthogonal first and second scanning directions to form a scanning light beam, a first prism and a second prism both used for allowing the scanning light beam to pass therethrough for performing two-dimensional scanning on an imaging surface and formation of an image. By adjustment of the angle between the first prism and the second prism, various conditions are satisfied to achieve image distortion correction and image lift.

9 Claims, 4 Drawing Sheets

LASER PROJECTOR

BACKGROUND OF THE INVENTION

The present invention relates to a laser projector, especially to a laser projector in which a first prism and a second prism are disposed on a scanning light path between a deflection component (microelectromechanical systems (MEMS) two-dimensional scanning mirror) and an imaging surface. An angle between the two prisms satisfies specific conditions. Thereby an image scanned and projected on the imaging surface achieves image distortion correction and image lift.

In a two-dimensional scanning projector with a single light spot, an incident light beam is off-axially delivered to a MEMS mirror for scanning and formation of an emitted light beam. Thus there are problems of image distortion and image lift. The image lift means the projected image needs to be moved upward. When the projector is placed on a desk or on a floor and in use, the lower half of the projected image is displayed on the desk or on the floor. The projected image is unable to be displayed on the whole imaging surface (such as screen) and this is inconvenient for users.

While a light spot is used together with a two-dimensional deflection component for scanning and projection, distortion on the imaging surface caused reduced quality of the image. The image distortion is caused by non-linearity between the scanning angle of deflection member and the distance to the imaging surface scanned, or oblique projection for image lift. In prior arts including U.S. Pat. No. 7,839,552 (CN100468123C), U.S. Pat. No. 7,957,047, U.S. Pat. No. 7,385,745, U.S. Pat. No. 7,256,917, U.S. Pat. No. 6,859,329, US2011/0141441, etc, a plurality of aspheric components or optical components with aspheric reflecting surfaces at fixed positions are used for correction of image distortion. However, aspheric components are difficult both in manufacturing and examination. Thus the cost is quite high. Moreover, the components should be assembled carefully in order to maintain respective positions of the components. The errors in the positions affect correction effect of the image distortion and change the size of the laser spot along the distance. Thus the assembly is quite difficult. As to U.S. Pat. No. 7,839,552 (CN100468123C), the optical components used (such as aspheric components or aspheric reflecting surfaces) are only for image distortion correction. Yet the present invention provides a laser projector in which a first prism and a second prism arranged in turn at a light path from a MEMS mirror to an imaging surface, and an angle between the two prisms satisfies specific conditions. Thus the scanned and projected image on the imaging surface are corrected and lifted up.

Refer to U.S. Pat. No. 7,878,658, a prism with multiple surfaces is used to guide light paths and correct image distortion. The prism includes an incident surfaces, an exit surface and internal surface for reflecting light beam. A light beam is incident into the prism through a first incident surface, reflected multiple times in the prism, and emitted out from the first surface at a designed angle. Then the light beam is incident into a deflection component, reflected and scanned and then entered the prism again through a second incident surface (original first exit surface). Next the light beam is emitted out from a second exit surface to form an image on an imaging surface. The second incident surface and the second exit surface are arranged in a non-parallel manner and such design is used for correction of image distortion. Moreover, the light path is guided by respective total reflecting inclined surfaces. However, the shape of the prism is quite complicated. The complicated processing of the prism results in high cost. Furthermore, the prism used is only for correction of image distortion and not related to image lift while the present invention includes a first prism and a second prism arranged in turn at a light path from a MEMS mirror to an imaging surface. An angle between the two prisms satisfies specific conditions so as to achieve both correction and lift-up of the image scanned and projected on the imaging surface.

Refer to U.S. Pat. No. 8,107,147 (WO2010/111216, CN102365573A) and US2010/0060863 (WO2010/030467, CN102150070A), both use mirrors for reducing image distortion. In U.S. Pat. No. 8,107,147, two scan mirrors are used for two dimensional scanning to generate a two dimensional image. A fold mirror for reflection is positioned on an output optic or combined with a scanning mirror to be formed on a common substrate. The output optic may be utilized to reduce or increase an amount of distortion in an image, please refer to FIG. 7 to FIG. 9 and description related to the output optic 710. Although the output optic 710 in some embodiment is a wedge optic that alters the output image, the output optic 710 can still be utilized to reduce or eliminate distortion an image generated, without the function of image lift. As to US2010/0060863, at least one wedge optic is disposed after the MEMS scanner. Refer to U.S. Pat. No. 8,107,147 (WO2010/111216, CN102365573A) and US2010/0060863 (WO2010/030467, CN102150070A), both use mirrors for reducing image distortion. In U.S. Pat. No. 8,107,147, two scan mirrors are used for two dimensional scanning to generate a two dimensional image. A fold mirror for reflection is positioned on an output optic or combined with a scanning mirror to be formed on a common substrate. The output optic may be utilized to reduce or increase an amount of distortion in an image, please refer to FIG. 7 to FIG. 9 and description related to the output optic 710. Although the output optic 710 in some embodiment is a wedge optic that alters the output image, the output optic 710 can still be utilized to reduce or eliminate distortion an image generated, without the function of image lift. As to US2010/0060863, at least one wedge optic is disposed after the MEMS scanner. Although two or more wedge optics are used in combination (refer to FIG. 2 and wedge optics 210, 218), they are utilized to correct and/or adjust chromatic aberration. The technique revealed in US2010/0060863 is unable to correct image distortion and lift the image at the same time. As to the present invention, two prisms are disposed in turn on a light path from a MEMS mirror to an imaging surface and an angle between the two prisms satisfies specific conditions. Thus both correction of image distortion and image lift are provided.

Refer to U.S. Pat. No. 8,159,735 (WO2010/021331, CN102132191B), a deflection apparatus is arranged to incline obliquely to perform an oblique projection onto a screen. The light beam is deflected by the deflection apparatus to be scanned and projected onto the screen obliquely. Thus the image can be displayed over the entire screen even the projector is placed on the desk or on the floor. However, the distortion of the image (such as trapezoidal distortion) is reduced or eliminated without provision of a projection optical system. No prism is disposed between the deflection component/apparatus (such as MEMS mirror) and the imaging surface (such as screen). The correction of the image distortion is by certain conditions of the direction of the incident light beam into the deflection apparatus. For example, as described in claim 1 and claim 2, a normal line of the reflection member of the deflection apparatus in the screen-center display state is tilted toward the negative direction side in the second scanning direction with respect to a normal line of the projection surface. A conditional expression "0.25<θmems/θin<0.75"in claim 3 is fulfilled. θmems is an angle formed by the normal line of the reflection member of the deflection apparatus in the screen-center display state and a normal line of the projection surface in the second scanning direction while θin is an incidence angle in the second scanning direction when a principal ray from the laser light source is incident on the reflection member of the deflection apparatus in the screen-center display state. Thus the technique revealed in the U.S. Pat. No. 8,159,735 requires no projection optical system while reducing distortion. In contrast, the present invention includes two prisms disposed between the deflection component/apparatus (such as MEMS mirror) and the imaging surface (such as screen) and the angle between the two prisms satisfies specific conditions for correction of image distortion and image lift. Thus the technique and features revealed in U.S. Pat. No. 8,159,735 are different from those of the present invention.

As to the disadvantages of the prior arts mentioned above, please refer to the following table.

while the second prism allows the scanning light beam emitted from the exit surface of the first prism passed through an incident surface of the second prism and the second prism to be emitted out from an exit surface of the second prism. Then an image is formed by two-dimensional scanning of the scanning light beam on an imaging surface. The projector achieves image distortion correction and image lift by setting the angle between the first prism and the second prism to satisfy specific conditions.

In order to achieve the above object, a laser projector of the present invention includes a laser source, a deflection component, a first prism, and a second prism. The laser source generates an input light beam for scanning and the input light beam is fed to a reflecting mirror of the deflection component (MEMS two-dimensional scanning mirror). The deflection component (MEMS two-dimensional scanning mirror) deflects the input light beam from the laser source to a first scanning direction and a second scanning direction, both are orthogonal to each other. The scanning speed in the first scanning direction is higher than that of the second scanning direction. The first prism consists of an incident surface and an exit surface. The incident surface and the exit surface are disposed in a non-parallel manner. The scanning

| | disadvantages | | | | | | |
|---|---|---|---|---|---|---|---|
| prior arts | difficulty in component | low component tolerance | high cost | reduced assembly tolerance | large volume | complicated drive control | no image lift control | limited effect on distortion |
| U.S. Pat. No. 7,256,917 | ■ | ■ | ■ | ■ | ■ | | | |
| U.S. Pat. No. 7,385,745 | ■ | ■ | ■ | ■ | ■ | | | |
| U.S. Pat. No. 7,839,552 | ■ | ■ | ■ | ■ | ■ | | | |
| U.S. Pat. No. 7,878,658 | ■ | ■ | ■ | ■ | | | | |
| U.S. Pat. No. 7,957,047 | ■ | ■ | ■ | ■ | | | | |
| U.S. Pat. No. 8,107,147 | | | | | | ■ | ■ | |
| U.S. Pat. No. 8,159,735 | | | | | | | | ■ |
| U.S. Pat. No. 6,859,329 | ■ | ■ | ■ | ■ | ■ | | | |
| US 2004/0141221 | ■ | ■ | ■ | ■ | | | | |
| US 2009/0251668 | ■ | ■ | ■ | ■ | | | | |
| US 2010/0060863 | | | | | | | ■ | |
| US 2010/0253991 | ■ | ■ | ■ | ■ | ■ | | | |
| US 2011/0141441 | ■ | ■ | ■ | ■ | ■ | ■ | | |

SUMMARY OF THE INVENTION

Therefore it is a primary object of the present invention to provide a laser projector that solves not only technical problems mentioned above, but also achieves image distortion correction and image lift. The laser projector includes a laser source module, a deflection component, a first prism, and a second prism. The laser source module is used for generating an input light beam that is fed to a reflecting mirror of the deflection component (such as MEMS two-dimensional scanning mirror). The deflection component (MEMS two-dimensional scanning mirror) deflects the input light beam from the laser source toward a first scanning direction (fast axis) and a second scanning direction (slow axis). The first scanning direction and the second scanning direction are mutually orthogonal to each other. The first prism allows a scanning light beam from the deflection component (MEMS two-dimensional scanning mirror) passed through an incident surface of the first prism and the first prism to be out from an exit surface of the first prism light beam from the deflection component (MEMS two-dimensional scanning mirror) is passed through the incident surface of the first prism and the first prism to be emitted out from the exit surface of the first prism. The second prism consists of an incident surface and an exit surface. The incident surface and the exit surface are arranged in a non-parallel manner. The scanning light beam from the exit surface of the first prism is passed through the incident surface of the second prism and the second prism to be emitted out from the exit surface of the second prism. Then the scanning light beam performs two-dimensional scanning on an imaging surface to form an image on the imaging surface. The extended direction of an angle between the exit surface and the incident surface of the first prism, and the extended direction of an angle between the exit surface and the incident surface of the second prism are opposite to each other. The exit surface of the first prism, the incident surface of the first prism, the exit surface of the second prism and the incident surface of the second prism are arranged in a non-parallel manner. The laser projector satisfies the following equations (1) and (2).

$$0.1 < \theta_{mems}/\theta_{in} < 0.4 \quad (1)$$

$$\theta_{sh} > \theta_{sc} > \theta_{s1} > 0° \text{ or } \theta_{sh} < \theta_{sc} < \theta_{s1} < 0° \quad (2)$$

wherein θmems is the angle between the surface normal of the mirror and the surface normal of the imaging surface formed in the second scanning direction when the deflection component (MEMS two-dimensional scanning mirror) is at the initial state;

θin is an incident angle of the input light beam in the second scanning direction when the input light beam from the light source is incident into the mirror and the deflection component (MEMS two-dimensional scanning mirror) is at the initial state;

θsh is the angle between the scanning light beam and the surface normal of the imaging surface in the second scanning direction with the larger absolute value under the condition that the deflection angle θs2 of the deflection component (MEMS two-dimensional scanning mirror) in the second scanning direction is maximum;

θsc is the angle between the scanning light beam and the surface normal of the imaging surface in the second scanning direction when the deflection component (MEMS two-dimensional scanning mirror) is at the initial state (the deflection angle θs2 is zero);

θs1 is the angle between the scanning light beam and the surface normal of the imaging surface in the second scanning direction with the smaller absolute value under the condition that the deflection angle θs2 of the deflection component (MEMS two-dimensional scanning mirror) in the second scanning direction is maximum.

The input light beam is fed to the deflection component (MEMS two-dimensional scanning mirror) by different light paths. The light path is determined according to the position of the laser source in relative to the first and the second prisms in the laser projector. The present invention includes, but not limited to three light paths. When the laser source is arranged at the first position, the input light beam is directly fed to the MEMS two-dimensional scanning mirror to form the scanning light beam. The input light beam is first passed through the first prism and then fed to the MEMS two-dimensional scanning mirror) when the laser source is arranged at the second position. At last, the input light beam is passed through the second prism, the first prism in turn, and then fed to the MEMS two-dimensional scanning mirror when the laser source is arranged at the third position.

The laser projector further satisfies following equations.

$$20° < \theta p1 < 37°;$$

$$7° < \theta p2 < 24°;$$

$$\theta s1 < 16°;$$

$$\theta s2 < 9°;$$

wherein θp1 is an angle between the exit surface and the incident surface of the first prism; θp2 is an angle between the exit surface and the incident surface of the second prism; θs1 is an deflection angle of the MEMS two-dimensional scanning mirror) in the first scanning direction; θs2 is a deflection angle of the MEMS two-dimensional scanning mirror in the second scanning direction.

The laser projector further satisfies the following equations.

$$0.1 < \theta_{mems}/\theta_{in} < 0.4;$$

$$20° < \theta p1 < 37°;$$

$$7° < \theta p2 < 24°;$$

$$\theta s1 < 16°;$$

$$\theta s2 < 9°;$$

wherein θp1 is an angle between the exit surface and the incident surface of the first prism; θp2 is an angle between the exit surface and the incident surface of the second prism; θs1 is an deflection angle of the MEMS two-dimensional scanning mirror) in the first scanning direction; θs2 is a deflection angle of the MEMS two-dimensional scanning mirror in the second scanning direction.

DETAILED DESCRIPTION OF THE PREFERRED EMBODIMENTS

Figure 1:
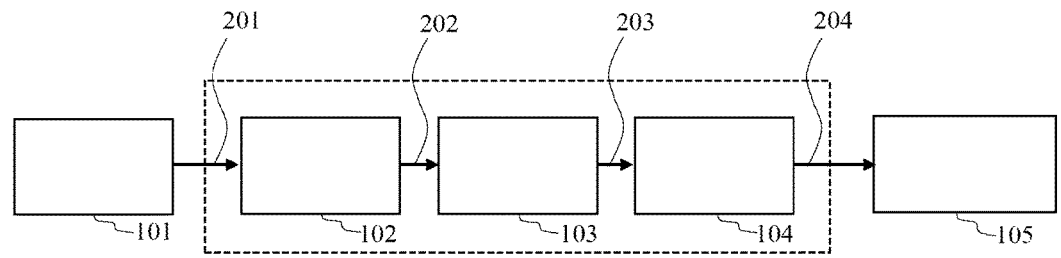
FIG. 1 is a block diagram showing system structure of an embodiment of a laser projector according to the present invention.
Figure 2:
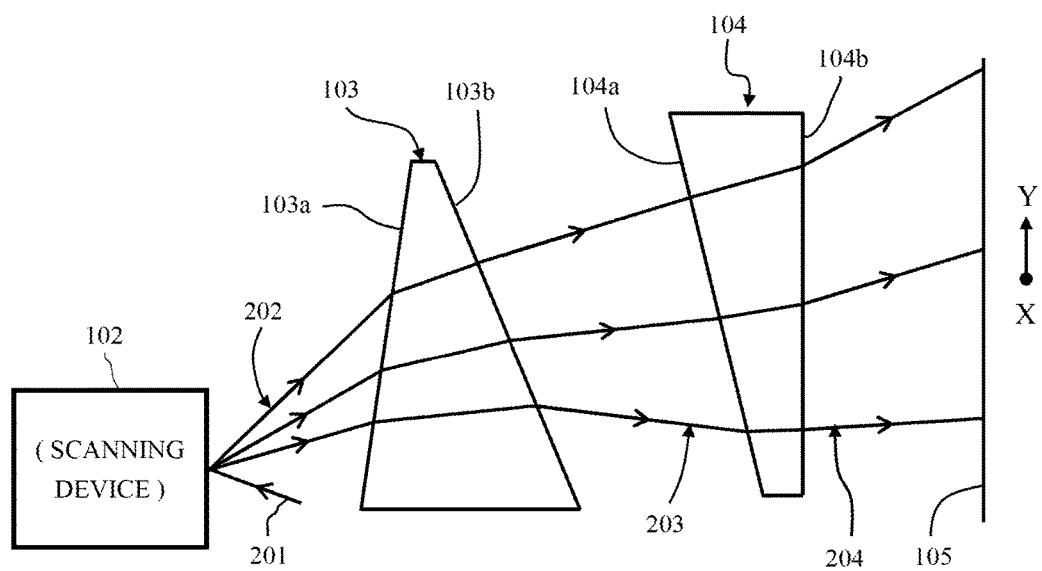
FIG. 2 is a schematic drawing showing a side view along Y-axis (slow-axis scanning direction) of an embodiment (with a laser source disposed on the first position) according to the present invention.
Figure 3:
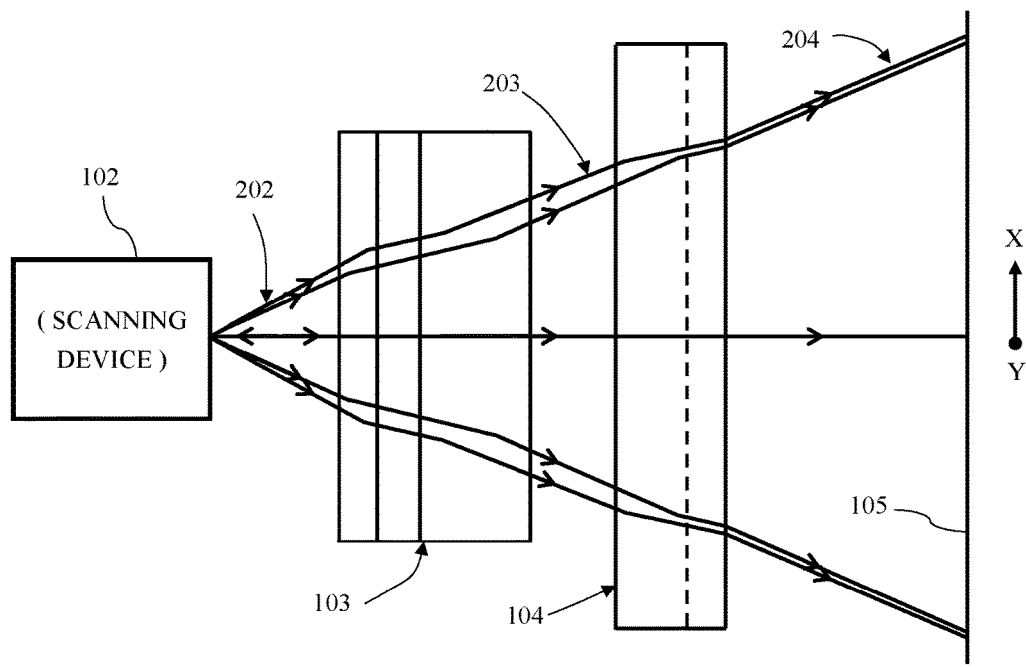
FIG. 3 is a schematic drawing showing a top view along X-axis (fast-axis scanning direction) of the embodiment in FIG. 2 according to the present invention.

Refer to FIG. 1, FIG. 2 and FIG. 3, a block diagram, a side view (Y axis-slow axis scanning direction) and a top view (X axis-fast axis scanning direction) showing system structure of a laser projector are disclosed. A laser projector of the present invention includes a laser source (module) 101, a deflection component (MEMS two-dimensional scanning mirror) 102, a first prism 103 and a second prism 104. The deflection component (MEMS two-dimensional scanning mirror) 102, the first prism 103 and the second prism 104 that form a scanning projection system are features of the present invention.

The laser source (module) 101 is used to generate an input light beam 201 that is fed to a reflecting mirror of the deflection component (MEMS two-dimensional scanning mirror) 102. The deflection component (MEMS two-dimensional scanning mirror) 102 deflects the input light beam 201 from the laser source (module) 101 toward a first scanning direction (fast-axis) (as the X-axis shown in FIG. 3) and a second scanning direction (slow-axis) (as the Y-axis shown in FIG. 2. The first scanning direction and the second scanning direction are mutually orthogonal to each other.

A scanning light beam 202 from the deflection component (MEMS two-dimensional scanning mirror) 102 passes through an incident surface 103a and the first prism 103 to be out from an exit surface 103b.

An emitted scanning light beam 203 from the exit surface 103b of the first prism 103 passes through an incident surface 104a and the second prism 104 to be emitted from an exit surface 104b. Then a scanning light beam 204 from the exit surface 104b is used to perform a two-dimensional scanning on an imaging surface 105 and get an image (105). That means the scanned image falls on the imaging surface 105. As shown in FIG. 1, FIG. 2 and FIG. 3, the deflection component (MEMS two-dimensional scanning mirror) 102 makes the scanning light beam 204 perform two-dimensional scanning along the first scanning direction (fast axis), as the X axis shown in FIG. 3 and the second scanning direction (slow axis), as the Y axis shown in FIG. 2 to form the image (105). The first scanning direction and the second scanning direction are mutually orthogonal to each other. The scanning axis with a larger scanning angle is the fast axis, as the X axis shown in FIG. 3 while the scanning axis with a smaller scanning angle is the slow axis, as the Y axis shown in FIG. 2. In this embodiment the input light beam 201 from the laser source (module) 101 is incident (delivered) into the deflection component (MEMS two-dimensional scanning mirror) 102 along the slow-axis scanning direction, as shown in FIG. 2

Figure 4:
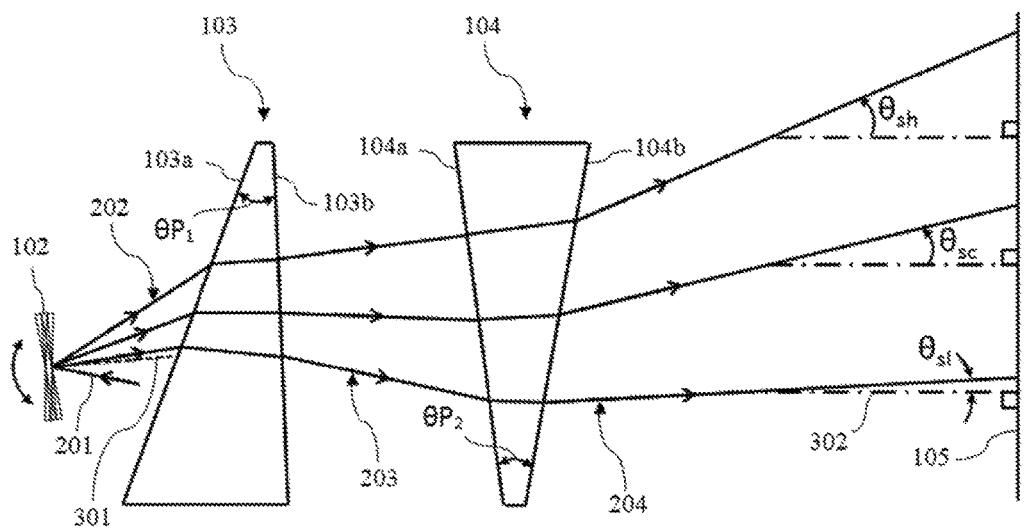
FIG. 4 is a schematic drawing showing a side view of the embodiment in FIG. 2 with related parameters according to the present invention.
Figure 6:
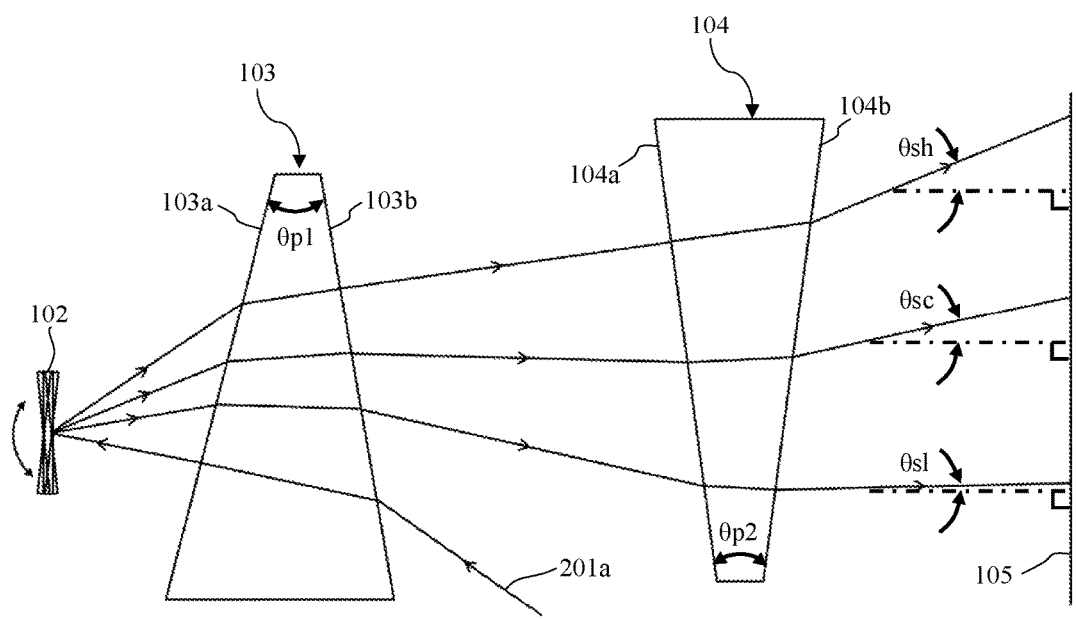
FIG. 6 is a schematic drawing showing a side view another embodiment (a laser source is disposed on a second position) with related parameters according to the present invention.
Figure 7:
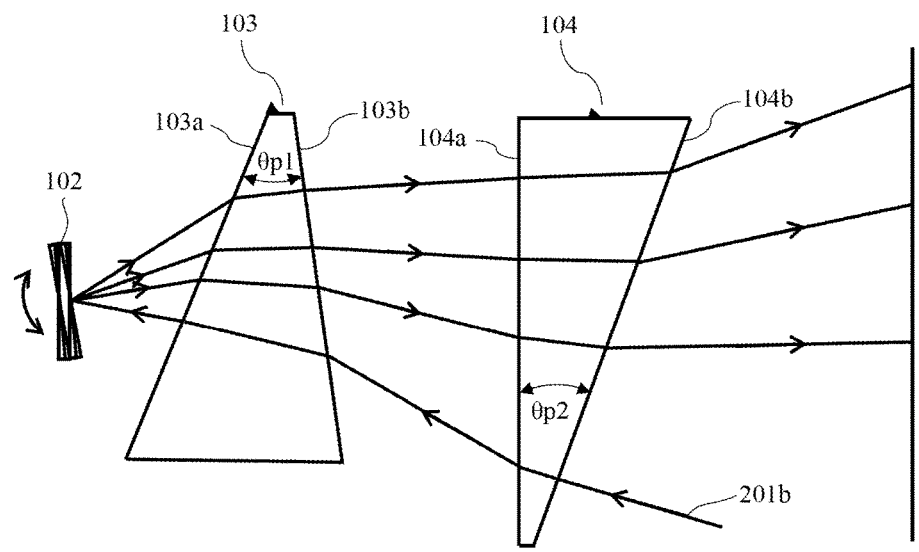
FIG. 7 is a schematic drawing showing a side view a further embodiment (a laser source is disposed on a third position) with related parameters according to the present invention.

Moreover, the laser source 101 in the laser projector can be disposed on the first position (as shown in FIG. 4), the second position (as shown in FIG. 6) and the third position (as shown in FIG. 7), but not limited. Thus the input light beam 201 is fed to the deflection component (MEMS two-dimensional scanning mirror) 102 by three different light paths.

The first light path: When the laser source 101 is arranged at the first position, the input light beam 201 is directly fed to the deflection component (MEMS two-dimensional scanning mirror) 102, as shown in FIG. 2 and FIG. 4. The input light beam 201 is moved along the second (slow axis) scanning direction and incident into the reflecting mirror of the deflection component (MEMS two-dimensional scanning mirror) 102 to form the scanning light beam 202. Then the scanning light beam 202 out of the reflecting mirror is incident into the first prism 103 and the second prism 104 in turn.

The second light path: Refer to FIG. 6, the input light beam 201 is first passed through the first prism 103 and then fed to the deflection component (MEMS two-dimensional scanning mirror) 102 when the laser source 101 is arranged at the second position. The input light beam 201 is incident into the first prism 103 along the second (slow axis) scanning direction, out of the first prism 103 and incident into the reflecting mirror of the deflection component (MEMS two-dimensional scanning mirror) 102 to form the scanning light beam 202 for scanning. Then the scanning light beam 202 out of the reflecting mirror (102) is incident into the first prism 103 and the second prism 104 in turn.

The third light path: Refer to FIG. 7, the input light beam 201 is passed through the second prism 104, the first prism 103 in turn, and then fed to the deflection component (MEMS two-dimensional scanning mirror) 102 when the laser source 101 is arranged at the third position. The input light beam 201 is incident into the second prism 104, the first prism 103 in turn along the second (slow axis) scanning direction, out of the first prism 103 and incident into the reflecting mirror of the deflection component (MEMS two-dimensional scanning mirror) 102 to form the scanning light beam 202 for scanning. Then the scanning light beam 202 out of the reflecting mirror (102) is incident into the first prism 103 and the second prism 104 in turn.

As shown in FIG. 2 and FIG. 6, the angle between the first prism 103 and the second prism 104 satisfies the following condition: the extended direction of an angle $\theta p1$ formed between the exit surface 103b and the incident surface 103a of the first prism 103 and the extended direction of an angle $\theta p2$ formed between the exit surface 104b and the incident surface 104a of the second prism 104 are opposite to each other. Moreover, the exit surface 103b of the first prism 103, the incident surface 103a of the first prism 103, the exit surface 104b of the second prism 104 and the incident surface 104a of the second prism 104 are arranged in a non-parallel manner.

Figure 5:
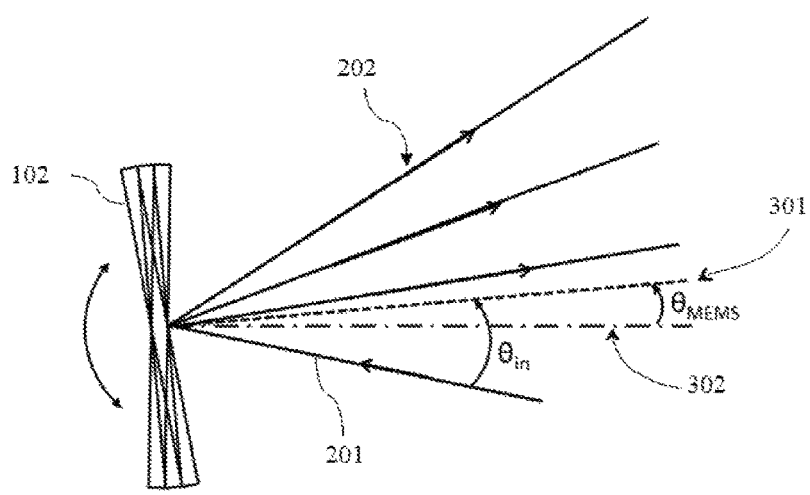
FIG. 5 is a schematic drawing showing a partial side view of an embodiment with related parameters according to the present invention.

Furthermore, the parameters related to the present invention are defined first in order to explain technical features (or the components) of the present invention. Refer to FIG. 4 and FIG. 5, a side view and a partial side view of an embodiment of the laser projector (the same as the embodiment in FIG. 2) with related parameters are revealed. The input light beam 201 is fed to the reflecting mirror of the deflection component (MEMS two-dimensional scanning mirror) 102. An angle formed between the input light beam 201 and a surface normal 301 of the mirror is $\theta in$, as shown in FIG. 5. The mirror is the reflecting mirror of the deflection component (MEMS two-dimensional scanning mirror) 102. An angle formed between the surface normal 301 of the mirror and the surface normal of the imaging surface 302 is $\theta mems$. The angle between the exit surface 103b and the incident surface 103a of the first prism 103 is $\theta p1$. The angle between the exit surface 104b and the incident surface 104a of the second prism 104 is $\theta p2$ while $\theta s1$ is the deflection angle of the deflection component (MEMS two-dimensional scanning mirror) 102 along the first scanning direction and $\theta s2$ is the deflection angle of the deflection component (MEMS two-dimensional scanning mirror) 102 along the second scanning direction.

The positive and the negative of the values of $\theta sh$, $\theta sc$, $\theta s1$ are defined as followings: The positive is defined as the surface normal of the imaging surface 302 is rotated counterclockwise to the light while the negative is defined as clockwise rotation. Whether the rotation is clockwise or counterclockwise is determined by the small rotation angle.

Figure 8:
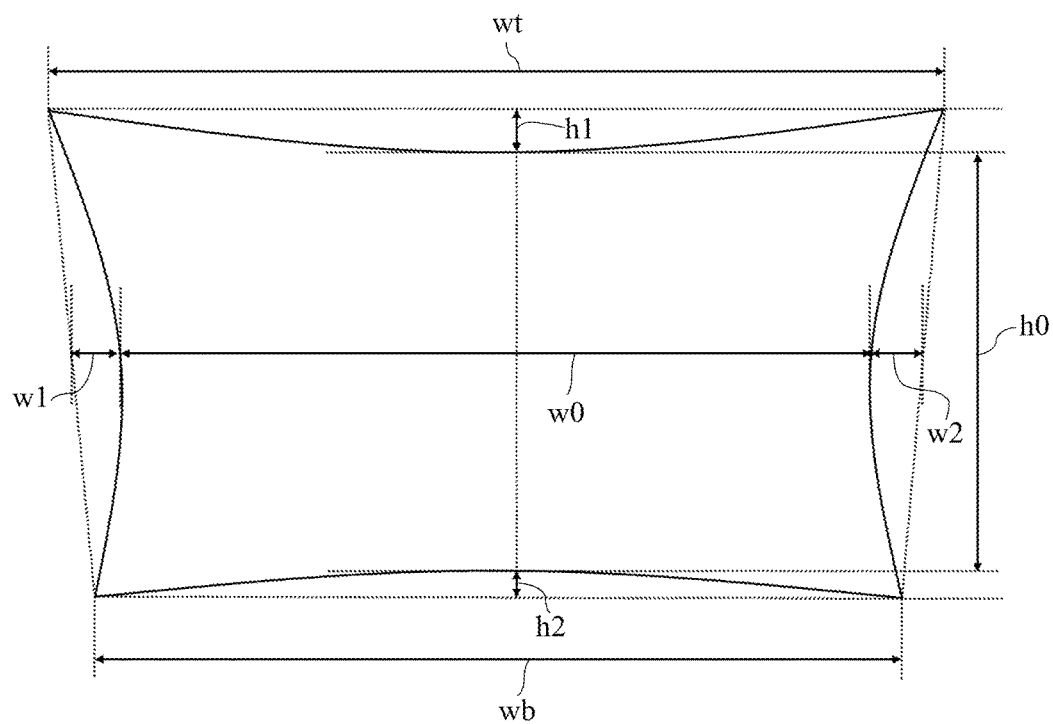
FIG. 8 is a schematic drawing showing image distortion on an imaging surface of an embodiment with related parameters according to the present invention.

Refer to FIG. 8, the trapezoidal distortion mentioned in the present invention is defined as: $((wt-wb)/w0)\times100(\%)$. The TV distortion includes top side distortion defined as $(h1/h0)\times100(\%)$, bottom side distortion defined as $(h2/h0)\times100(\%)$, left side distortion defined as $(w1/w0)\times100(\%)$ and right side distortion defined as $(w2/w0)\times100(\%)$. wt is an actual horizontal width on the top side of the projected image; wb is an actual horizontal width on the bottom side of the projected image; w0 is an actual horizontal width at the center of the projected image; h1 is the vertical distortion on top of the projected image and h2 is the vertical distortion on bottom of the projected image; w1 is the horizontal distortion on left of the projected image and w2 is the horizontal distortion on right of the projected image; and h0 is the actual vertical length at the center of the projected image.

The techniques of the present invention features on that the laser projector of the present invention satisfies the following equation (1) and equation (2).

$$0.1<\theta mems/\theta in<0.4 \quad (1)$$

$$\theta sh>\theta sc>\theta s1>0° \text{ or } \theta sh<\theta sc<\theta s1<0° \quad (2)$$

wherein θmems is the angle between the surface normal of the mirror and the surface normal of the imaging surface formed in the second scanning direction (Y-axis, slow axis) when the deflection component (MEMS two-dimensional scanning mirror) 102 is at the initial state; θin is an incident angle of the input light beam in the second scanning direction when the input light beam from the light source is incident into the mirror and the deflection component (MEMS two-dimensional scanning mirror) 102 is at the initial state; θsh is the angle between the scanning light beam and the surface normal of the imaging surface in the second scanning direction with the larger absolute value under the condition that the deflection angle θs2 of the deflection component (MEMS two-dimensional scanning mirror) 102 in the second scanning direction is maximum. θsc is the angle between the scanning light beam and the surface normal of the imaging surface in the second scanning direction when the deflection component (MEMS two-dimensional scanning mirror) 102 is at the initial state (the deflection angle θs2 is zero). θs1 is the angle between the scanning light beam and the surface normal of the imaging surface in the second scanning direction with the smaller absolute value under the condition that the deflection angle θs2 of the deflection component (MEMS two-dimensional scanning mirror) 102 in the second scanning direction is maximum.

The first embodiment of the present invention satisfies the following conditions: Trapezoidal distortion<2.0%; TV distortion<2%; θmems/θin: 0.13~0.25; θp1: 29°~33°; θp2: 12°~16°; θs1<14.2°; θs2<8.1°; θsh>θsc>θs1>0° or θsh<θsc<θs1<0°. Thus the present invention can achieve image distortion modulation and image lift.

The first embodiment of the present invention further satisfies: θmems/θin=0.1889; θp1=30.910°; θp2=13.702°; θs1=14.000°; θs2=8.051°, θsh>θsc>θs1>1.0°; Trapezoidal distortion=1.069%; top side TV distortion=1.751%; bottom side TV distortion=1.223%; left side TV distortion=0.7749/0; right side TV distortion=0.774%. Thus the present invention can achieve image distortion modulation and image lift.

The component location and ray tracing of the above embodiment are shown in the following table 1 and table 2.

The second embodiment of the present invention satisfies the following conditions: Trapezoidal distortion<1.5%; TV distortion<1.594%; 0.25<θmems/θin<0.38; 27°<θp1<30°; 12°<θp2<16°; θs1<14.2°; θs2<8.7°; θsh>θsc>θs1>1.0°. Thus the present invention can achieve image distortion modulation and image lift.

The second embodiment of the present invention further satisfies: θmems/θin=0.3159; θp1=28.490°; θp2=14.017°; θs1=14°; θs2=8.65°; θsh>θsc>θs1>1.0°. Trapezoidal distortion=1.045%; top side TV distortion=1.003%; bottom side TV distortion=1.198%; left side TV distortion=0.721%; right side TV distortion=0.721%. Thus the present invention can achieve image distortion modulation and image lift.

The component location and ray tracing of the second embodiment are shown in the following table 3 and table 4.

The third embodiment of the present invention satisfies the following conditions: Trapezoidal distortion<1.5%; TV distortion<1.2%; 0.22<θmems/θin<0.38; 24°<θp1<28°; 15°<θp2<19°; θs1<10.6°; θs2<6.4°; θsh>θsc>θs1>0.5°. Thus the present invention can achieve image distortion modulation and image distortion correction.

The third embodiment of the present invention further satisfies: θmems/θin=0.2995; θp1=26.132°; θp2=17.387°; θs1=10.5°; θs2=6.317°; θsh>θsc>θs1>0.5°; Trapezoidal distortion=1.139%; top side TV distortion=0.996%; bottom side TV distortion=1.024%; left side TV distortion=0.594%; right side TV distortion=0.594%. Thus the present invention can achieve image distortion modulation and image lift.

The component location and ray tracing of the third embodiment are shown in the following table 5 and table 6.

Compared with conventional techniques, the present invention has following advantages:

(1) First the production of the components is easier and the cost is reduced. The first prism and the second prism are processed by plane machining. And the optical surface of each prism includes only an incident surface and an exit surface. Thus the production of the prisms is easier and the cost is also down.

(2) The present invention has lower tolerance requirement for assembly. The optical surfaces of the two prisms are flat surfaces so that the component tolerance is increased and the assembly tolerance is reduced. This is beneficial to quality control and mass production of the laser projector.

(3) The laser projector of the present invention achieves image distortion modulation and image lift. This helps increasing of the market share and competitiveness of the laser projector Additional advantages and modifications will readily occur to those skilled in the art. Therefore, the invention in its broader aspects is not limited to the is specific details, and representative devices shown and described herein. Accordingly, various modifications may be made without departing from the spirit or scope of the general inventive concept as defined by the appended claims and their equivalents.

TABLE 1 component location of the first embodiment

| Component Surface | X-coordinate | Y-coordinate | Z-coordinate | Surface tilt Y | Nd | Vd | Comment |
|---|---|---|---|---|---|---|---|
| 0 | 0.00000000 | −1.12221830 | 3.01121713 | 0.00000000 | 0.00000000 | 0.00000000 | 201 |
| 1 | 0.00000000 | 0.00000000 | 0.00000000 | 0.00000000 | 0.00000000 | 0.00000000 | MEMS-mirror (102) |
| 2 | 0.00000000 | 3.83001165 | 5.08532918 | 8.19982058 | 1.69680123 | 56.19982541 | Prism-01 (103a) |
| 3 | 0.00000000 | 3.83001165 | 7.83523177 | −22.71034332 | 0.00000000 | 0.00000000 | Prism-01 (103b) |
| 4 | 0.00000000 | 4.74332635 | 9.41158763 | −13.70158853 | 1.76182349 | 26.61320270 | Prism-02 (104a) |
| 5 | 0.00000000 | 4.74332635 | 11.00820493 | 0.00000000 | 0.00000000 | 0.00000000 | Prism-02 (104b) |
| 6 | 0.00000000 | 0.00000000 | 513.55820493 | 0.00000000 | 0.00000000 | 0.00000000 | Image plane (105) |

TABLE 2 ray tracing of the first embodiment

| Raytrace Surface | X-coordinate | Y-coordinate | Z-coordinate | X-cosine | Y-cosine | Z-cosine | Incident Angle | Comment |
|---|---|---|---|---|---|---|---|---|
| 0 | 0.000000 | −1.122218 | 3.011217 | 0.000000 | −0.349216 | 0.937042 | 20.439383 | 201 |
| 1 | 0.000000 | 0.000000 | 0.000000 | 0.000000 | 0.499360 | 0.866395 | 25.198514 | MEMS-mirror (102) |
| 2 | 0.000000 | 2.849577 | 4.944050 | 0.000000 | 0.226334 | 0.974050 | 38.157466 | Prism-01 (103a) |
| 3 | 0.000000 | 3.548737 | 7.952951 | 0.000000 | 0.107434 | 0.994212 | 9.629019 | Prism-01 (103b) |
| 4 | 0.000000 | 3.732975 | 9.657914 | 0.000000 | 0.164430 | 0.986389 | 7.534149 | Prism-02 (104a) |
| 5 | 0.000000 | 3.958067 | 11.008205 | 0.000000 | 0.291778 | 0.956486 | 9.464118 | Prism-02 (104b) |
| 6 | 0.000000 | 157.261741 | 513.558205 | 0.000000 | 0.291778 | 0.956486 | 16.964410 | Image plane (105) |

TABLE 3 component location of the second embodiment

| Component Surface | X-coordinate | Y-coordinate | Z-coordinate | Surface tilt Y | Nd | Vd | Comment |
|---|---|---|---|---|---|---|---|
| 0 | 0.00000000 | −2.98323345 | 7.43798016 | 0.00000000 | 0.00000000 | 0.00000000 | 201a |
| 1 | 0.00000000 | 1.32774778 | 5.15646746 | −14.24461058 | 1.72916425 | 54.66903147 | Prism-01 (103b) |
| 2 | 0.00000000 | 1.32774778 | 2.51276083 | 14.24550669 | 0.00000000 | 0.00000000 | Prism-01 (103a) |
| 3 | 0.00000000 | 0.00000000 | 0.00000000 | 0.00000000 | 0.00000000 | 0.00000000 | MEMS-mirror (102) |
| 4 | 0.00000000 | 1.32774778 | 2.51276083 | 14.24550669 | 1.72916425 | 54.66903147 | Prism-01 (103a) |
| 5 | 0.00000000 | 1.32774778 | 5.15646746 | −14.24461058 | 0.00000000 | 0.00000000 | Prism-01 (103b) |
| 6 | 0.00000000 | 2.81548297 | 9.50819879 | −7.97965078 | 1.88300431 | 40.81091485 | Prism-02 (104a) |
| 7 | 0.00000000 | 2.81548297 | 11.15174726 | 6.03703961 | 0.00000000 | 0.00000000 | Prism-02 (104b) |
| 8 | 0.00000000 | 0.00000000 | 514.15174726 | 0.00000000 | 0.00000000 | 0.00000000 | Image plane (105) |

TABLE 4 ray tracing of the second embodiment

| Raytrace Surface | X-coordinate | Y-coordinate | Z-coordinate | X-cosine | Y-cosine | Z-cosine | Incident Angle | Comment |
|---|---|---|---|---|---|---|---|---|
| 0 | 0.00000000 | −2.98323345 | 7.43798016 | 0.00000000 | −0.67861401 | 0.73449508 | 42.73543189 | 201a |
| 1 | 0.00000000 | −1.55037212 | 5.88712862 | 0.00000000 | −0.25298664 | 0.96746977 | 56.98004247 | Prism-01 (103b) |
| 2 | 0.00000000 | −0.54375147 | 2.03761680 | 0.00000000 | −0.25805723 | 0.96612963 | 0.40881006 | Prism-01 (103a) |
| 3 | 0.00000000 | 0.00052129 | −0.00006312 | 0.00000000 | 0.48119254 | 0.87661493 | 21.85906715 | MEMS-mirror (102) |
| 4 | 0.00000000 | 1.38830279 | 2.52813479 | 0.00000000 | 0.15478913 | 0.98794753 | 43.00882465 | Prism-01 (103a) |
| 5 | 0.00000000 | 1.78203395 | 5.04113896 | 0.00000000 | 0.08632463 | 0.99626706 | 5.34004400 | Prism-01 (103b) |
| 6 | 0.00000000 | 2.17685304 | 9.59772108 | 0.00000000 | 0.11113110 | 0.99380576 | 3.02745031 | Prism-02 (104a) |
| 7 | 0.00000000 | 2.34506684 | 11.10199705 | 0.00000000 | 0.30863939 | 0.95117913 | 12.41756220 | Prism-02 (104b) |
| 8 | 0.00000000 | 165.57506349 | 514.15174726 | 0.00000000 | 0.30863939 | 0.95117913 | 17.97725264 | Image plane (105) |

TABLE 5 component location of the third embodiment

| Component Surface | X-coordinate | Y-coordinate | Z-coordinate | Surface tilt Y | Nd | Vd | Comment |
|---|---|---|---|---|---|---|---|
| 0 | 0.00000000 | −2.00000000 | 5.09620929 | 0.00000000 | 0.00000000 | 0.00000000 | 201a |
| 1 | 0.00000000 | 0.56723606 | 3.62141825 | −6.98387251 | 1.88300431 | 40.81091485 | Prism-01 (103b) |
| 2 | 0.00000000 | 0.56723606 | 2.00290573 | 19.14801635 | 0.00000000 | 0.00000000 | Prism-01 (103a) |
| 3 | 0.00000000 | 0.00000000 | 0.00000000 | 0.00000000 | 0.00000000 | 0.00000000 | MEMS-mirror (102) |
| 4 | 0.00000000 | 0.56723606 | 2.00290573 | 19.14801635 | 1.88300431 | 40.81091485 | Prism-01 (103a) |
| 5 | 0.00000000 | 0.56723606 | 3.62141825 | −6.98387251 | 0.00000000 | 0.00000000 | Prism-01 (103b) |
| 6 | 0.00000000 | 0.80000000 | 6.64387071 | 0.00000000 | 1.88300431 | 40.81091485 | Prism-02 (104a) |
| 7 | 0.00000000 | 0.80000000 | 7.89868774 | 17.38732901 | 0.00000000 | 0.00000000 | Prism-02 (104b) |
| 8 | 0.00000000 | 0.00000000 | 510.89868774 | 0.00000000 | 0.00000000 | 0.00000000 | Image plane (105) |

TABLE 6 ray tracing of the third embodiment

| Raytrace Surface | X-coordinate | Y-coordinate | Z-coordinate | X-cosine | Y-cosine | Z-cosine | Incident Angle | Comment |
|---|---|---|---|---|---|---|---|---|
| 0 | 0.00000000 | −2.00000000 | 5.09620929 | 0.00000000 | −0.63237386 | 0.77466334 | 39.22547995 | 201a |
| 1 | 0.00000000 | −0.94757600 | 3.80698098 | 0.00000000 | −0.26620068 | 0.96391763 | 46.20935245 | Prism-01 (103b) |
| 2 | 0.00000000 | −0.36040161 | 1.68081152 | 0.00000000 | −0.20986519 | 0.97773033 | 3.70970685 | Prism-01 (103a) |
| 3 | 0.00000000 | 0.00038410 | −0.00003482 | 0.00000000 | 0.38225452 | 0.92405708 | 17.29392733 | MEMS-mirror (102) |
| 4 | 0.00000000 | 0.87283459 | 2.10901561 | 0.00000000 | 0.02439515 | 0.99970239 | 41.62141905 | Prism-01 (103a) |
| 5 | 0.00000000 | 0.90872008 | 3.57958685 | 0.00000000 | −0.06334460 | 0.99799171 | 5.58599462 | Prism-01 (103b) |
| 6 | 0.00000000 | 0.71422363 | 6.64387071 | 0.00000000 | −0.03347045 | 0.99943971 | 3.63181000 | Prism-02 (104a) |
| 7 | 0.00000000 | 0.67352708 | 7.85908424 | 0.00000000 | 0.22375521 | 0.97464537 | 15.46925503 | Prism-02 (104b) |
| 8 | 0.00000000 | 116.15935840 | 510.89868774 | 0.00000000 | 0.22375521 | 0.97464537 | 12.92969075 | Image plane (105) |

What is claimed is:

1. A laser projector comprising:

a laser source that generates an input light beam for scanning and the input light beam being fed to a reflecting mirror of a deflection component for being scanned and formation of a scanning light beam;

the deflection component that deflects the input light beam from the laser source to a first scanning direction and a second scanning direction; wherein the first scanning direction and the second scanning direction are mutually orthogonal and a scanning speed in the first scanning direction is faster than a scanning speed in the second scanning direction;

a first prism having an incident surface and an exit surface that are both flat surfaces; wherein the scanning light beam from the deflection component is passed through the incident surface of the first prism and the first prism to be emitted out from the exit surface of the first prism; the incident surface of the first prism and the exit surface of the first prism are arranged in a non-parallel manner;

a second prism having an incident surface and an exit surface that are both flat surfaces; wherein the incident surface and the exit surface are arranged not parallel to each other; the scanning light beam from the exit surface of the first prism is passed through the incident surface of the second prism and the second prism to be emitted out from the exit surface of the second prism; the scanning light beam performs two-dimensional scanning on an imaging surface to form an image on the imaging surface; the incident surface of the second prism and the exit surface of the second prism are arranged in a non-parallel manner;

wherein an extended direction of an angle between the exit surface of the first prism and the incident surface of the first prism, and an extended direction of an angle between the exit surface of the second prism and the incident surface of the second prism are opposite to each other; the exit surface of the first prism, the incident surface of the first prism, the exit surface of the second prism and the incident surface of the second prism are all mutually arranged in a non-parallel manner; wherein the laser projector satisfies the following equations:

$\theta sh > \theta sc > \theta s1 > 0°$ or $\theta sh < \theta sc < \theta s1 < 0°$;

wherein $\theta sh$ is an angle between the scanning light beam and a surface normal of the imaging surface in the second scanning direction with a larger absolute value while a deflection angle $\theta s2$ of the deflection component in the second scanning direction is maximum;

$\theta sc$ is an angle between the scanning light beam and a surface normal of the imaging surface in the second scanning direction when the deflection component is at an initial;

$\theta s1$ is an angle between the scanning light beam and a surface normal of the imaging surface in the second scanning direction with a smaller absolute value while the deflection angle $\theta s2$ of the deflection component in the second scanning direction is maximum; and $\theta s2$ is a deflection angle of the deflection component in the second scanning direction, when the deflection component is at an initial state with no deflection, the deflection angle $\theta s2 = 0$;

wherein the laser projector further satisfies the following equations:

$0.1 < \theta mems/\theta in < 0.4$;

$20° < \theta p1 < 37°$;

$7° < \theta p2 < 24°$;

$\theta s1 < 16°$;

$\theta s2 < 9°$; and $\theta sh > \theta sc > \theta s1 > 0°$ or $\theta sh < \theta sc < \theta s1 < 0°$;

wherein $\theta mems$ is an angle between a surface normal of the deflection component and a surface normal of the imaging surface formed in the second scanning direction when the deflection component is at the initial state; $\theta in$ is an incident angle of the input light beam when the input light beam from the light source is incident into the deflection component and the deflection component is at the initial state; $\theta p1$ is an angle between the exit surface and the incident surface of the first prism; $\theta p2$ is an angle between the exit surface and the incident surface of the second prism; $\theta s1$ is an deflection angle of the deflection component in the first scanning direction.

2. The device as claimed in claim 1, wherein the deflection component is a MEMS two-dimensional scanning mirror.

3. The device as claimed in claim 1, wherein a light path of the input light beam fed from the laser source to the reflecting mirror of the deflection component for being scanned and formation of the scanning light beam is selected from the group consisting of: a path from the laser source to the deflection component, a path from the laser source, through the first prism to the deflection component, and a path from the laser source, through the second prism and the first prism in turn to the deflection component.

4. The device as claimed in claim 1, wherein the laser projector further satisfies the following equations:

$0.13 < \theta mems/\theta in < 0.25$;

$29° < \theta p1 < 33°$;

$12° < \theta p2 < 16°$;

$\theta s1 < 14.2°$;

$\theta s2 < 8.1°$;

$\theta sh > \theta sc > \theta s1 > 1.0°$.

5. The device as claimed in claim 4, wherein the laser projector further satisfies the following equations:
trapezoidal distortion<2.0%; and
TV distortion<2.0%;
wherein the trapezoidal distortion is defined as (wt−wb)/w0)×100(%); the TV distortion is defined as any one of top side distortion=(h1/h0)×100(%), bottom side distortion=(h2/h0)×100(%), left side distortion=(w1/w0)×100(%), and right side distortion=(w2/w0)×100(%);
wherein wt is an actual horizontal width on a top side of a projected image; wb is an actual horizontal width on a bottom side of the projected image; w0 is an actual horizontal width at a center of the projected image; h1 is a vertical distortion on the top side of the projected image; h2 is a vertical distortion on the bottom side of the projected image; w1 is a horizontal distortion on left of the projected image and w2 is a horizontal distortion on right of the projected image; h0 is an actual vertical length at a center of the projected image.

6. The device as claimed in claim 1, wherein the laser projector further satisfies the following equations:

$0.25 < \theta mems/\theta in < 0.38$;

$27° < \theta p1 < 30°$;

$12° < \theta p2 < 16°$;

$\theta s1 < 14.2°$;

$\theta s2 < 8.7°$;

$\theta sh > \theta sc > \theta s1 > 1.0°$.

7. The device as claimed in claim 6, wherein the laser projector further satisfies the following equations:
trapezoidal distortion<1.5%; and
TV distortion<1.5%;
wherein the trapezoidal distortion is defined as (wt−wb)/w0)×100(%); the TV distortion is defined as any one of top side distortion=(h1/h0)×100(%), bottom side distortion=(h2/h0)×100(%), left side distortion=(w1/w0)×100(%), and right side distortion=(w2/w0)×100(%);
wherein wt is an actual horizontal width on a top side of a projected image; wb is an actual horizontal width on a bottom side of the projected image; w0 is an actual horizontal width at a center of the projected image; h1 is a vertical distortion on the top side of the projected image; h2 is a vertical distortion on the bottom side of the projected image; w1 is a horizontal distortion on left of the projected image and w2 is a horizontal distortion on right of the projected image; h0 is an actual vertical length at a center of the projected image.

8. The device as claimed in claim 1, wherein the laser projector further satisfies the following equations:

$0.22 < \theta mems/\theta in < 0.38$;

$24° < \theta p1 < 28°$;

$15° < \theta p2 < 19°$;

$\theta s1 < 10.6°$;

$\theta s2 < 6.4°$;

$\theta sh > \theta sc > \theta s1 > 0.5°$.

9. The device as claimed in claim 8, wherein the laser projector further satisfies the following equations:
trapezoidal distortion<1.5%; and
TV distortion<1.2%; wherein the trapezoidal distortion is defined as (wt−wb)/w0)×100(%); the TV distortion is defined as any one of top side distortion=(h1/h0)×100(%), bottom side distortion=(h2/h0)×100(%), left side distortion=(w1/w0)×100(%), and right side distortion=(w2/w0)×100(%); wherein wt is an actual horizontal width on a top side of a projected image; wb is an actual horizontal width on a bottom side of the projected image; w0 is an actual horizontal width at a center of the projected image; h1 is a vertical distortion on the top side of the projected image; h2 is a vertical distortion on the bottom side of the projected image; w1 is a horizontal distortion on left of the projected image and w2 is a horizontal distortion on right of the projected image; h0 is an actual vertical length at a center of the projected image.

* * * * *